Nov. 4, 1930.    R. W. LEACH ET AL    1,780,160
VALVE
Filed Jan. 17, 1929    2 Sheets-Sheet 1

R. W. Leach &
W. H. Bateman
INVENTORS

Nov. 4, 1930.    R. W. LEACH ET AL    1,780,160
VALVE
Filed Jan. 17, 1929    2 Sheets-Sheet 2

R. W. Leach & W. H. Bateman
INVENTORS

By: Marks & Clark
Attys.

Patented Nov. 4, 1930

1,780,160

UNITED STATES PATENT OFFICE

ROBERT WILLIAM LEACH AND WILLIAM HENRY BATEMAN, OF NEWPORT, ENGLAND

VALVE

Application filed January 17, 1929, Serial No. 333,073, and in Great Britain January 21, 1928.

This invention relates to valves of the kind in which a cylindrical member is capable of moving axially within a body part for the purpose of opening and closing the valve. The object of the invention is to provide improved means for lubricating the contacting surfaces of the fixed and movable parts and for maintaining a fluid tight joint between the said parts.

The invention comprises the provision in the fixed and movable parts, of lubricant distributing channels which are so formed or arranged as to surround the aperture through the valve when the latter is opened or closed, provision being also made to interrupt the supply of viscous lubricant under pressure to some of the passages when the latter are exposed during the movement of the cylindrical member.

In the two accompanying sheets of explanatory drawings:—

Figure 1:
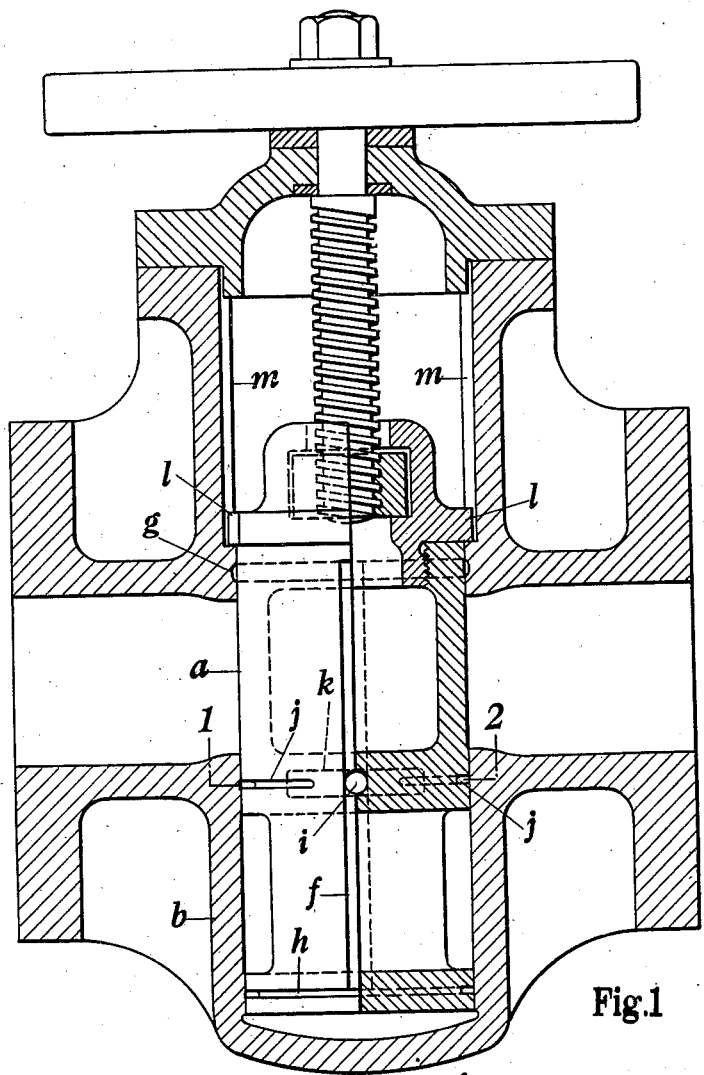
Figure 1 is a sectional side elevation of a cylindrical valve provided with lubricating means in accordance with this invention, the valve being shown closed.
Figure 2:
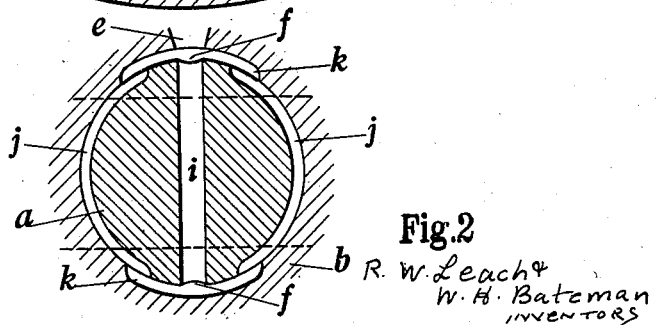
Figure 2 is a cross section of a portion of the valve on the line 1, 2, Figure 1.
Figure 4:
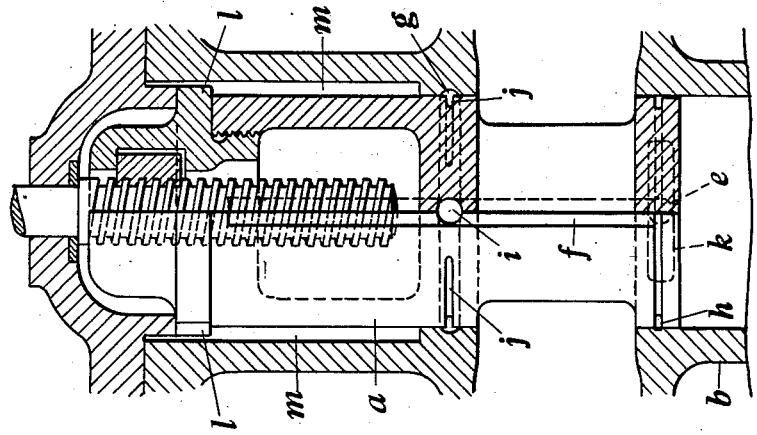
Figure 4 is a sectional side elevation similar to Figure 1 and showing the upper part of the valve, the valve being open.
Figure 3:
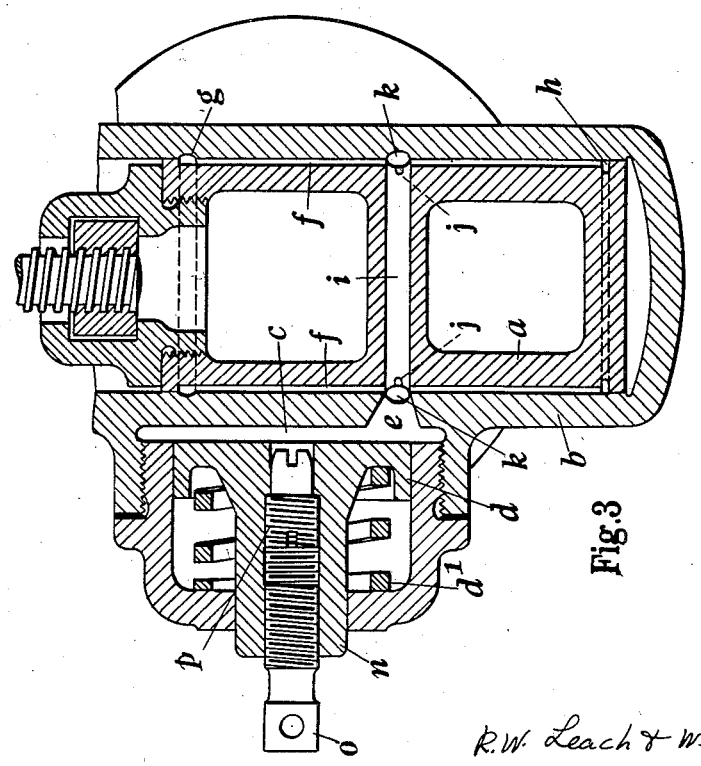
Figure 3 is a sectional side elevation of the lower portion of the valve at right angles to the plane of section of Figure 1.

In carrying the invention into effect as shown, the movable member $a$ of the valve is made of cylindrical form and is arranged to slide axially within a suitable body part $b$. Within the body part a lubricant reservoir $c$ is provided and the lubricant therein is put under pressure by means of a piston $d$ which is acted upon by a spring $d'$ or pressure fluid. Lubricant flows from this chamber through a hole $e$ into longitudinal grooves $f$ formed along the exterior and on opposite sides of the movable member $a$ and arranged to terminate at their upper end in a circumferential groove $g$ in the body part and at their lower end in a circumferential groove $h$ in the movable member. The longitudinal grooves $f$ are connected together by a distributing passage $i$ formed diametrically across the cylindrical member. Adjacent to the transverse distributing passage $i$ in the movable member, circumferential grooves $j$ are also formed around the movable member, but these do not completely surround the said member. At their ends they communicate with and supply lubricant to relatively short grooves $k$ in the body part. When the valve is closed as shown in Figure 1 the aperture through the valve is completely surrounded by lubricant under pressure, and all the grooves and channels are in communication with the reservoir. During the movement of the valve to the open position (Figure 4) the intermediate circumferential grooves $j$ which do not completely surround the movable member pass out of communication with the body grooves $k$ and are thereby cut off from the source of pressure. Consequently, during the interval in which these grooves are exposed, there is no material leakage of lubricant from them. When the valve is fully open communication is reestablished through the upper groove $g$ as shown in Figure 4.

To prevent rotation of the part $a$ its upper end is provided with a pair of key like projections $l$ (Figures 1 and 4) engaging grooves $m$ in the body part, the grooves being located in a plane at right angles to that containing the lubricant grooves $f$ so that the later are not exposed when the valve part is raised to the upper position. As regards the piston $d$, the stem $n$ may be made hollow to receive the charge of lubricant, the aperture being closed at its outer end by a plug $o$. A fitting $p$ containing a non-return valve may be provided at the inner end of the stem.

It will be apparent that the formation or disposition of the grooves may be varied in a number of ways to meet different requirements, but in all cases the essential features are as above described. Also the position of the lubricant reservoir, and the means for applying pressure may be varied.

Having thus described our invention what we claim as new and desire to secure by Letters Patent is:—

1. In a valve, a body part having a passage, a cylindrical member slidable axially within said body part, the body part and cylindrical member having adjacent working faces, lubricant distributing channels in the body part and cylindrical member, said channels surrounding the valve passage, and means for supplying lubricant to the channels under pressure, certain of the channels moving out of communication with other channels when the movable member is moved from one position to another.

2. In a valve, a body part having a passage, a cylindrical member slidable axially within said body part, the body part and cylindrical member having adjacent working faces, a circumferential groove and a pair of segmental grooves located at different points on the working face of the body part, and longitudinal, circumferential and segmental grooves in the cylindrical member, and means for supplying the grooves with lubricant under pressure, the various grooves surrounding the passage and interrupting the supply of lubricant to the segmental grooves in the slidable part when the latter is being moved from one position to another.

In testimony whereof we have signed our names to this specification.

ROBERT WILLIAM LEACH.
WILLIAM HENRY BATEMAN.